Nov. 29, 1932.  C. A. DE GIERS  1,889,089
EXPANSION INDICATOR
Filed Aug. 20, 1930   2 Sheets-Sheet 1

Inventor
Clarence A. de Giers
By his Attorneys
Cooper, Kerr & Dunham

Nov. 29, 1932.  C. A. DE GIERS  1,889,089
EXPANSION INDICATOR
Filed Aug. 20, 1930    2 Sheets-Sheet 2
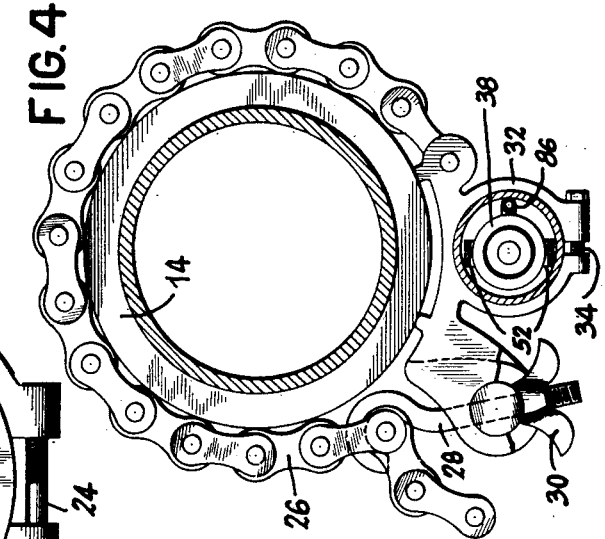
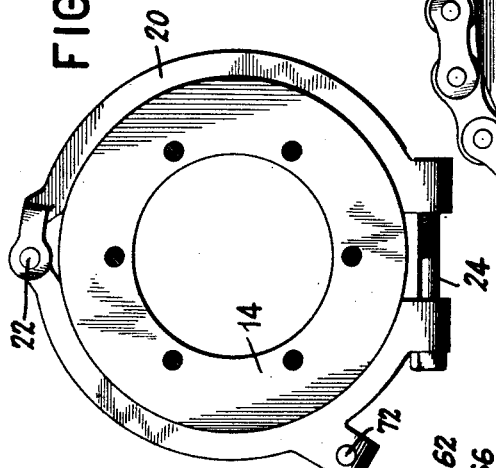
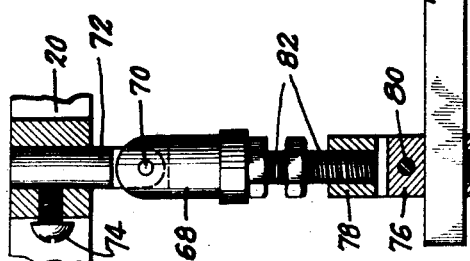
Inventor
Clarence A. de Giers
By his Attorneys
Cooper, Kerr & Dunham Patented Nov. 29, 1932

1,889,089

UNITED STATES PATENT OFFICE

CLARENCE A. DE GIERS, OF FOREST HILLS, NEW YORK, ASSIGNOR TO THE LIQUIDOMETER CORPORATION, OF LONG ISLAND CITY, NEW YORK, A CORPORATION OF DELAWARE

EXPANSION INDICATOR

Application filed August 20, 1930. Serial No. 476,486.

The invention pertains to indicators especially adapted for accurately measuring and recording changes of dimension of the object to which it is attached.

For the purpose of illustration the device is shown applied to an expansion joint in a steam pipe, and is arranged to give a continuous printed record of the length of variations in length of the joint.

The principal object of the invention is to provide a device thoroughly reliable in operation even when subjected to wide changes in temperature, portable in form and readily adaptable to a wide range of usefulness, of low cost, rugged construction, and which gives at a remote point a readily readable magnified continuous indication of changes of length of the object to which it is applied.

Further and other objects and advantages will be apparent from the specification and claims, and from the accompanying drawings which illustrate what is considered to be the preferred embodiment of the invention.

Fig. 2 is an enlarged view, partly in section, of that portion of the device which is clamped to the object to be gauged.

Fig. 3 is a view of the upper clamp, on the line 3—3 of Fig. 1.

Fig. 4 is a view on the line 4—4 of Fig. 1, showing the lower clamp.

Fig. 5 is a view on the line 5—5 of Fig. 2.

Figure 1:
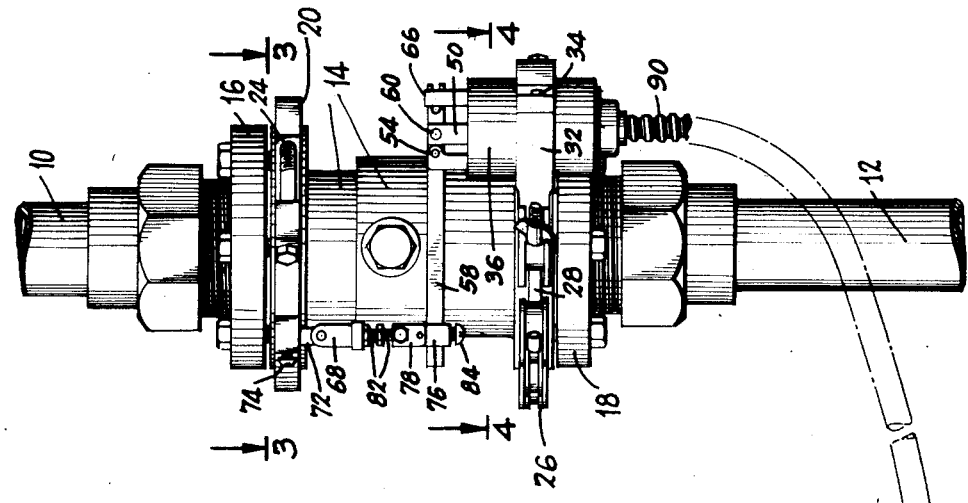
Fig. 1 is a view of the entire device, applied to a steam pipe expansion joint, some parts being broken away.
Figure 1:
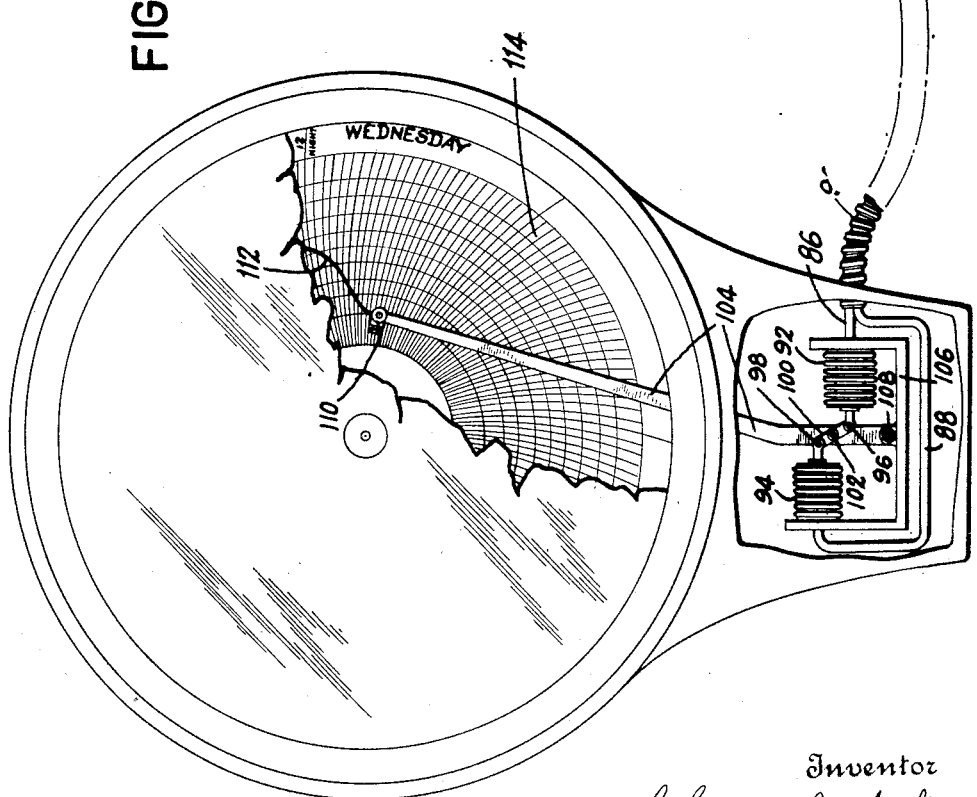

Referring to Fig. 1, upper steam pipe 10 is connected to lower pipe 12 by an expansion joint designated generally as 14 and having upper and lower flanges 16 and 18. Underneath flange 16 is a clamp collar 20 (Figs. 1 and 3) hinged as at 22 and provided with a locking screw 24 by which the collar may be firmly held in place at the upper end of joint 14. Above lower flange 18 is a clamp 26, preferably of the chain type (Figs. 1 and 4) so as to be readily adaptable to pipes of various sizes. A hook bolt 28 with wing nut 30 serves to hold the clamp tightly at the lower end of the expansion joint.

Carried by chain collar 26 is a split clamp 32 adapted by means of screw 34 to tightly grip the frame 36 of the hydraulic actuating unit of the apparatus. This unit comprises two axially aligned sylphons 38 and 40 (Fig. 2), the upper head of sylphon 38 being rigidly attached to disk 42 which in turn is rigidly attached to frame 36. In like manner the lower head of sylphon 40 is attached to disk 44 which also is attached to frame 36. Clamped between the adjacent heads 46 and 48 of the sylphons is the cross bar 50 of a U-shaped member having arms 52 extending upwardly beyond sylphon 38.

Fulcrumed at 54 on an upward extension 56 of disk 42 is a horizontal lever 58, and mounted in the short end of lever 58 is a cross bar 60, each end of which pivotally engages an end of the U-member 50. A portion of lever 58 extending beyond bar 60 is slotted as at 62 and is adapted to be locked by a bent pin 64 to a bifurcated arm 66 extending upwardly from disk 42. The locking pin is inserted for shipping purposes or to hold parts in fixed position for adjustment purposes.

The long end of lever 58 is connected to collar 20 by a link comprising a socket 68 (pivotally attached at 70 to a pin 72 held by screw 74 in clamp 20), a block 76 slidably mounted on lever 58, a socket 78 pivotally connected to block 76 by pin 80, and a right and left threaded screw 82 entering sockets 68 and 78. It will be appreciated that by adjusting screw 82 the relative positions of lever 58 and clamp 20 will be changed, and that by moving block 76 along lever 58 the angular rotation of lever 58 about its fulcrum 54 may be varied with reference to any increment of vertical travel of collar 20. Block 76 is held in position by screw 84.

From the above description it will be realized that when collars 20 and 26 move vertically relatively to each other, lever 58 will be rocked around its fucrum 54, and through the instrumentality of U-member 50 will cause one of the sylphons 38, 40 to expand and the other to contract. Both sylphons are full of liquid, preferably oil. From the top of the upper sylphon and from the bottom end of the lower sylphon, oil-filled pipes 86 and 88, respectively, lead through conduit 90 to the remote indicating unit, where pipes 86 and 88 are connected to fixed ends of a pair of similar sylphons 92 and 94, respectively, which likewise are filled with oil.

Sylphons 92 and 94, instead of being in axial alignment as are sylphons 38, 40, are in offset relationship on parallel axes, their adjacent ends being pivotally connected by pins 96 and 98 to opposite ends of a floating link 100 which is fulcrumed at its middle on stud 102 set into arm 104, which in turn is fulcrumed on frame 106 at 108. The upper end of arm 104 carries a pen 110 suitable for marking a continuous record 112 on a chart 114 which is adapted to be rotated by clock work.

The lengthening of one sylphon 92 or 94 and the shortening of the other, moves link 100 and pin 102 bodily to right or left, thereby swinging arm 104 about its fulcrum 108 and causing pen 110 to assume a position on the chart in harmony with the changed length of the object being tested, which in the present case is expansion joint 14.

In normal operation of the apparatus as described above, one sylphon 92, 94 is always lengthened a certain amount and the other shortened the same amount, thereby moving link 100 and pin 102 bodily to right or left. If a temperature change occurs, however, the volume of oil contained in the system changes, and the apparatus would not function correctly were it not for link 100. When the change of volume occurs, sylphons 92 and 94 both shorten or both lengthen, but in either case link 100 simply turns idly on its pivot 102 without moving arm 104. Link 100 therefore serves as a temperature-compensating device to maintain correct functioning of the system regardless of temperature.

The amplitude of swing of arm 104 is dependent on the angular rotation, or swing, of lever 58; therefore, to adjust the swing of arm 104 it is only necessary to move block 76 on lever arm 58. To set arm 104 at any desired reference position, such as a zero position, it is only necessary to turn screw 82.

It is to be understood that the invention is not limited to the specific embodiment herein illustrated and described, but may be used in other ways without departure from its spirit as defined by the following claims.

I claim—

1. Apparatus for indicating changes in the length of an object comprising, in combination, a collar attachable to one portion of the object to be measured, an hydraulic device carried by said collar, a lever for operating said hydraulic device, a second collar attachable to another portion of the object to be measured, a connection between the lever and said second collar offset from the axis of the hydraulic device, a hydraulic indicator connected to said hydraulic device, and means for adjusting the connection between the lever and the second collar whereby the amplitude of movement of the indicator and hydraulic device may be co-related to obtain a correct reading on the indicator.

2. Apparatus for indicating changes in the length of an object comprising, in combination, a collar attachable to one portion of the object to be measured, an hydraulic device carried by said collar, a lever for operating said hydraulic device, a second collar attachable to another portion of the object to be measured, a connection between the lever and said second collar offset from the axis of the hydraulic device, a hydraulic indicator connected to said hydraulic device, means for adjusting the connection between the lever and the second collar whereby the amplitude of movement of the indicator and hydraulic device may be co-related to obtain a correct reading on the indicator, together with means associated with the indicator to compensate for temperature changes in any position of the indicator.

3. Apparatus for indicating changes in the length of an object comprising, in combination, a collar attachable to a portion of the object whose length is to be measured, a pair of liquid filled sylphons carried by the collar, a second collar attached at a remote point to the object to be measured, an adjustable link depending from said second collar and offset from the axis of the sylphons, a lever adjustably connected to said link and operatively connected to said sylphons whereby expansion or contraction of said objects serves to alternatively expand one and contract the other of said sylphons, a second pair of liquid filled sylphons, liquid filled tubes connecting the first and second pair of sylphons whereby the sylphons of the second pair are lengthened and shortened in proportion to the lengthening and shortening of the first pair, a pointer operated by said second pair of sylphons, and means interconnecting said second pair of sylphons and the pointer for compensating for temperature changes in any position of the pointer.

In testimony whereof I hereto affix my signature.

CLARENCE A. DE GIERS.